United States Patent [19]

Gaudreau et al.

[11] Patent Number: 5,043,110
[45] Date of Patent: Aug. 27, 1991

[54] METHOD FOR TESTING FOAM FORMULATIONS

[75] Inventors: Laurent R. Gaudreau, Berwick, Me.; Ching T. Lue, Dover, N.H.; Robert Grimmer, Berwick, Me.

[73] Assignee: Davidson Textron Inc., Dover, N.H.

[21] Appl. No.: 468,051

[22] Filed: Jan. 22, 1990

Related U.S. Application Data

[62] Division of Ser. No. 282,192, Dec. 7, 1988, abandoned.

[51] Int. Cl.⁵ ............................................. B29C 67/22
[52] U.S. Cl. ............................. 264/40.1; 264/46.4; 264/338; 249/142; 156/64; 73/865.8
[58] Field of Search ............... 249/142, 151; 264/40.1, 264/46.6, 46.4, 46.7, 338; 73/865.8; 156/64

[56] References Cited

U.S. PATENT DOCUMENTS

| | | | |
|---|---|---|---|
| 3,123,403 | 3/1964 | Hood | 264/46.6 |
| 3,161,436 | 12/1964 | Hood | 264/46.7 |
| 3,229,615 | 1/1966 | Rattner | 249/151 |
| 3,825,647 | 7/1974 | Kirsch | 264/277 |
| 4,762,584 | 8/1988 | Andreasen et al. | 264/46.7 |
| 4,766,025 | 8/1988 | Sanok et al. | 249/142 |
| 4,948,541 | 8/1990 | Beck | 264/46.7 |

Primary Examiner—Robert A. Dawson
Assistant Examiner—Allan R. Kuhns
Attorney, Agent, or Firm—John C. Evans

[57] ABSTRACT

A method for testing foam formulations for the quantitative measure of the effects of formulation and/or process variable changes on some kinds of surface problems of a molded part caused by different degrees of imperfection or voiding underneath the part surface. The molded part can be single component or composite, solid or foamed. One example of the surface problem is the so-called "measles or cellulite" problem observed on the vinyl surface of a vinyl/foam composite due to the voids or rattiness within the foam. To accomplish this result, the mold has various sized, spaced apart, aligned openings formed in each of the front and rear walls of the mold, but with the centers thereof at different elevations in the respective front and rear walls. Removable rods inserted through the aligned mold wall openings produce longitudinal openings through the part which is molded around the rods, permitting the effect thereof on the surface of the molded part to be evaluated.

1 Claim, 1 Drawing Sheet

METHOD FOR TESTING FOAM FORMULATIONS

This is a division of application Ser. No. 282,192, filed on Dec. 7, 1988, and now abandoned.

FIELD OF THE INVENTION

This invention relates generally to reaction injection or conventional type molds and, more particularly, to such molds which serve to produce molded parts having simulated variable voids formed therein for evaluating the effect of polyurethane and vinyl formulation processing variables on the surface appearance of the foam molded parts.

BACKGROUND OF THE INVENTION

Heretofore, test molds for producing foam molded parts having simulated variable voids formed therein have not been available. Hence, the study of surface appearances resulting from polyurethane; and vinyl formulation processing variables of known sizes and locations has not been possible.

SUMMARY OF THE INVENTION

Accordingly, a general object of the invention is to provide a test mold assembly wherein predetermined voids or imperfect foam substructures may be produced in polyurethane composition foam parts with vinyl surfaces molded therein.

Another object of the invention is to provide a means to quantify the effect of formulation and/or processing variables on defect conditions of molded parts.

Another object of the invention is to provide a method for testing and quantifying formations of measles and cellulite in different formulations of polyurethane forming a layer of foam backing a layer of covering material.

Still another object of the invention is to provide a method of the preceding paragraph wherein the quantification of such formations is determined by forming a plurality of varied depth openings in the foam backing and thereafter heating the covering material and the layer of foam while observing the degree to which the preformed openings within the foam backing material are visually observable from the viewing side of the covering material.

Yet another object of the present invention is to provide a method for testing and quantifying the susceptibility of a formulation of polyurethane foam to the formation of measles effects and/or cellulite effects visually observable from the viewing surface of a covering backed by the foam comprising the steps of: placing a layer of covering material n a mold cavity; pouring a reactive plastic formulation into the mold cavity in backing relationship to the layer of covering material; forming holes at various depths within the plastic formation to provide a layer of backing foam on the layer of covering material having openings located at different depths below the covering material; removing the layer of covering material and the layer of backing foam from the mold cavity; heating the covering material and layer of backing foam to a predetermined temperature and observing the degree of raised or lowered sections over the openings for determining the susceptibility of the plastic formulation to formation of visually observable measles effects or cellulite effects attributable to openings at different depths within the layer of backing foam.

These and other objects and advantages will become more apparent when reference is made to the following drawing and the accompanying description.

BEST MODE OF CARRYING OUT THE INVENTION

Figure 1:
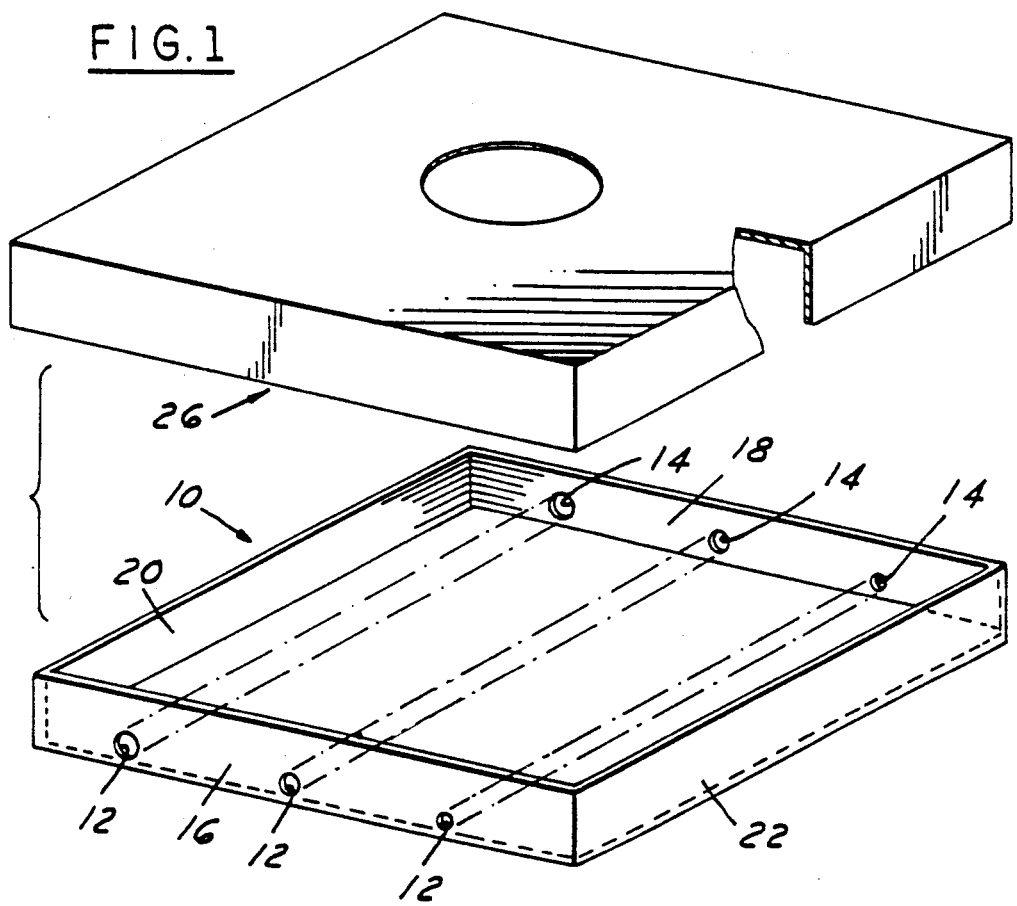
FIG. 1 is a perspective view of a mold assembly embodying the invention.

Referring now to the drawings in greater detail, FIG. 1 illustrates a reaction or foam pour test mold 10, which may be referred to as a "measles model" mold, having a plurality of equally spaced openings 12 and 14 formed in the respective disposed front and rear walls 16 and 18 thereof. Proceeding from left to right in FIG. 1, each succeeding opening 12 and 14 is progressively smaller in diameter, e.g., $\frac{3}{8}$ inch, 5/16 inch, and $\frac{1}{4}$ inch, with the openings 12 in the front wall 16 having their respective lowermost edges the same predetermined distance from the bottom surface of the mold 10, e.g., 0.040 inch, and the openings 14 in the rear wall 18 having their lowermost edges a second predetermined distance from the bottom surface of the mold, e.g., 0.160 inch. For such dimensions, the suggested mold height is one inch, with all four sides 12 inches in length. The openings 12 and 14 are thus seen to be three inches apart at their centers from each other and/or from the adjacent side walls 20 and 22. Rods 24 of $\frac{3}{8}$, 5/16 and $\frac{1}{4}$ inch diameter, respectively, are adapted to be removably inserted through the respective $\frac{3}{8}$, 5/16 and $\frac{1}{4}$ inch diameter openings 12 and 14. A cover 26 is removably attached to the mold 10 by suitable clamp means (not shown).

In operation, a thin vinyl skin shell 30, which has been molded in a separate slush mold operation, such as that disclosed in U.S. Pat. No. 4,562,032, issued Dec. 31, 1985, is first placed in the bottom of the open mold 10. The rods 24 are covered with a release coating and inserted through the respective aligned openings 12 and 14. A suitable reactive plastic formulation 32, e.g., a reaction injection molding or conventional low pressure polyurethane composition, is then poured into the mold and the mold covered with the cover 26. In view of the locations of the openings 12 and 14 in the respective front and rear walls 16 and 18, the rods 24 are installed at an angle along the length of the mold 10, such that the distance between the rods and the vinyl skin shell 30 progressively changes along the length of the rods.

The polyurethane reacts to completion or cures in the mold in the usual manner until it fills the entire cavity of the mold around the rods 24. The rods are then removed, leaving openings 34 in the vinyl shell polyurethane composite plaque, simulating voids or, so-called, "ratty" foam, after which the composite is removed from the mold 10.

The foamed article is then subjected to elevated temperatures, and the resultant surface appearance observed by noting the length and degree of any lowered and/or raised sections over the various openings 34. Hence, the test or measles mold 10 has served to simulate voids in a foam molded part and their effects on the appearance of such molded part, illustrating defects known in the industry as measles or cellulite.

Figure 2:
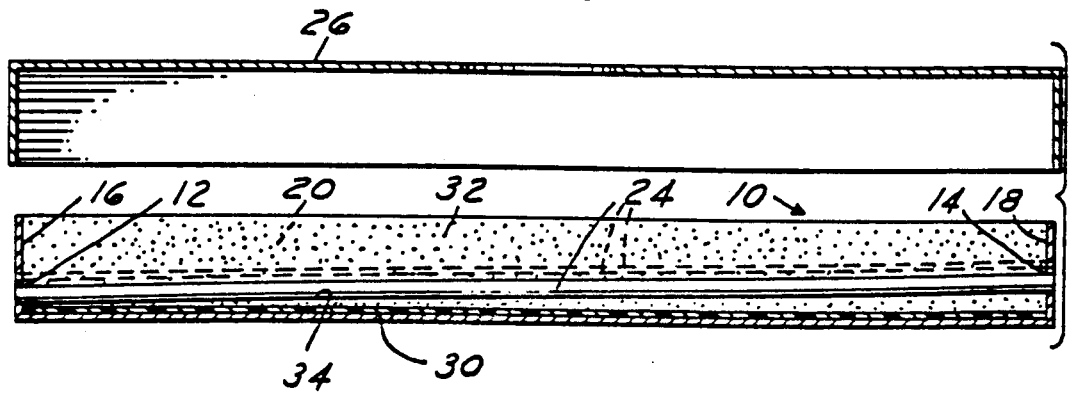
FIG. 2 is a side elevational view of the inventive mold assembly with a vinyl skin shell and polyurethane composition enclosed therein.

In summary, the method of the present invention constitutes a method for testing and quantifying the susceptibility of a formulation of polyurethane foam to the formation of measles effects and/or cellulite effects visually observable from the viewing surface of a covering backed by the foam. The method as shown in the drawings of FIGS. 1 and 2 includes the steps of: placing a layer of covering material in a mold cavity; pouring a reactive plastic formulation into the mold cavity in backing relationship to the layer of covering material; forming openings at various depths within the plastic formulation to provide a layer of backing foam on the layer of covering material having openings located at different depths below the covering material; removing the layer of covering material and the layer of backing foam with the openings therein from the mold cavity; heating the covering material and layer of backing foam to a predetermined temperature and observing the affect of the heat load thereon in producing either lowering or raising of the covering material for determining the susceptibility of the plastic formulation to formation of visually observable measles effects and/or cellulite effects attributable to the openings at different depths within the layer of backing foam.

INDUSTRIAL APPLICABILITY

It should be apparent that the invention provides a simple, efficient and economical test mold, with which simulated voids may be formed and their effect on the appearance of foam molded parts studied for particular reaction injection molding or conventional low pressure polyurethane compositions, to quantify a type of defect known as measles or cellulite.

It should also be apparent that the invention provides the ability to quantify the effect of formulation and/or processing variables by measuring the length of the deformation along the longitudinal axis of the simulated defects.

While but one embodiment of the invention has been shown and described, various dimensional modifications thereof may be utilized within the scope of the following claims The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or privilege is claimed are defined as follows:

1. A method for testing and quantifying the susceptibility of a formulation of polyurethane foam to the formation of measles effects and/or cellulite effects visually observable from the viewing surface of a covering backed by the foam comprising the steps of:

placing a layer of covering material in a mold cavity;

mounting a plurality of different diameter test rods on predetermined slopes across the mold at predetermined angles with respect to the layer of covering material;

covering the test rods with a release coating;

pouring a reactive plastic formulation into the mold cavity in backing relationship to the layer of covering material and filling the mold cavity completely around each of the test rods to form a layer of backing foam against the layer of covering material;

removing the test rods from the layer of backing foam, thereby forming different diameter openings along predetermined slopes through the layer of backing foam having different predetermined slope angles within the plastic formation of the layer of backing foam;

removing the layer of covering material and the layer of backing foam with the openings therein from the mold cavity;

heating the covering material and layer of backing foam to a predetermined temperature and observing the effect of a heat load thereon in producing either lowering or raising of the covering material, thereby determining the susceptibility of the plastic formulation to formation of visually observable measles effects and/or cellulite effects attributable to the openings at particular depths within the layer of backing foam.

* * * * *